United States Patent
Clemen, Jr. et al.

(10) Patent No.: US 10,455,199 B1
(45) Date of Patent: Oct. 22, 2019

(54) IMAGE MANAGEMENT SYSTEM FOR REDUCING EFFECTS OF LASER BEAMS

(71) Applicant: The Boeing Company, Chicago, IL (US)

(72) Inventors: Mark Joseph Clemen, Jr., Port Orchard, WA (US); James A. Grossnickle, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 14/823,677

(22) Filed: Aug. 11, 2015

(51) Int. Cl.
*H04N 7/18* (2006.01)
*H04N 5/247* (2006.01)
*G06T 7/00* (2017.01)

(52) U.S. Cl.
CPC ............ *H04N 7/188* (2013.01); *G06T 7/004* (2013.01); *G06T 7/0022* (2013.01); *H04N 5/247* (2013.01); *G06T 2207/10004* (2013.01); *G06T 2207/10032* (2013.01); *G06T 2207/10152* (2013.01)

(58) Field of Classification Search
CPC ... H04N 7/00; H04N 5/00; H04N 9/00; G01C 11/00; B64D 47/08; G06K 9/00
See application file for complete search history.

(56) References Cited

U.S. PATENT DOCUMENTS

| | | | |
|---|---|---|---|
| 9,626,588 B1* | 4/2017 | Antaki | G01V 8/00 |
| 2010/0121561 A1* | 5/2010 | Kodaira | G01C 11/02 701/532 |
| 2011/0169943 A1* | 7/2011 | Bachman, II | G06K 9/209 348/117 |
| 2014/0211060 A1* | 7/2014 | Funao | G06T 3/4015 348/311 |

OTHER PUBLICATIONS

Durecu et al., "Assessment of laser-dazzling effects on TV-cameras by means of pattern recognition algorithms," Technologies for Optical Countermeasures IV, SPIE 6738, Oct. 2007, 10 pages.

* cited by examiner

*Primary Examiner* — Maryam A Nasri
(74) *Attorney, Agent, or Firm* — Yee & Associates, P.C.

(57) ABSTRACT

A method and apparatus for countering an attack on a platform. Images are received from cameras associated with the platform, and the images are identified from a group of the cameras that have a desired level of information when a group of light sources is directed at a camera system. A fused image is generated from a combination of the images from the group of the cameras and displayed on a display system for the platform. The fused image enables performing an operation using the platform.

23 Claims, 9 Drawing Sheets

IMAGE MANAGEMENT SYSTEM FOR REDUCING EFFECTS OF LASER BEAMS

BACKGROUND INFORMATION

1. Field

The present disclosure relates generally to an improved imaging system for an aircraft and, in particular, to a method and apparatus for reducing the effects of light on a camera system for an aircraft. Still more particularly, the present disclosure relates to a method and apparatus for combining information in images to reduce the effects of light on a camera system for an aircraft.

2. Background

Laser pointers and other low-powered light sources can be a hazard when directed at aircraft. For example, laser pointers have been pointed at the cockpits of commercial aircraft during phases of flight, such as takeoff and landing at airports. The laser beam from a laser pointer can cause a distraction and may result in a dazzling effect on the pilot when the pilot is performing maneuvers during landing or takeoff. The dazzling effect may temporarily disorient the pilot. Additionally, the laser beam may cause an afterimage that lasts for several seconds, temporary blinding, and other undesirable effects that may reduce safety in operating the aircraft.

Multiple laser pointers have been directed towards a single aircraft, such a helicopter over a crowd of people. For example, protesters have targeted helicopters monitoring protests with laser pointers. These actions by the protestors make monitoring of the protesters difficult and often impossible to perform safely.

Therefore, it would be desirable to have a method and apparatus that take into account at least some of the issues discussed above, as well as other possible issues. For example, it would be desirable to have a method and apparatus that overcome a technical problem with performing operations using aircraft when light sources are directed towards the aircraft.

SUMMARY

An embodiment of the present disclosure provides an apparatus comprising cameras in a camera system associated with a platform, and an image manager in communication with the camera system. The image manager identifies images from a group of the cameras that have a desired level of information when a group of light sources is directed at the camera system. The image manager also generates a fused image from a combination of the images from the group of the cameras. The fused image enables performing an operation using the platform.

Another embodiment of the present disclosure provides an aircraft display system comprising a display system for an aircraft, cameras in a camera system associated with a platform, and an image manager in communication with the display system and the camera system. The cameras have different fields of view. The image manager identifies images from a group of the cameras from the camera system that have a desired level of information when a group of lasers is directed at the camera system. The image manager also generates a scene with a field of view and displays the scene on the display system from a combination of the images from the group of the cameras.

Another embodiment of the present disclosure provides a method for countering an attack on a platform. The method receives images from cameras associated with the platform and identifies the images from a group of the cameras that have a desired level of information when a group of light sources is directed at a camera system. The method generates a fused image from a combination of the images from the group of the cameras and displays the fused image on a display system for the platform. The fused image enables performing an operation using the platform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that rather than relying on looking through the windshield or window in the aircraft, a video may be generated by a camera on the aircraft. This video may be displayed on a display system in the aircraft to provide a visualization of the environment used by the pilot in performing operations with the aircraft.

The illustrative embodiments recognize and take into account that the use of a display system to view information about the exterior of the aircraft may be performed in a manner that avoids a laser beam or other bright light hitting the eyes of the pilot. However, the illustrative embodiments recognize and take into account that the laser beam may reduce the effectiveness of displaying information from the camera on the display system when the laser beam illuminates the camera.

The laser beam saturates pixels in the image sensor in the camera. This saturation of the pixels may result in one or more portions of the image sensor being unable to generate an image that shows the objects in the field of view of the camera. For example, spots of light may be present in the image obscuring objects that should be seen in the image. These spots may be a dazzling effect in the image.

Figure 1:
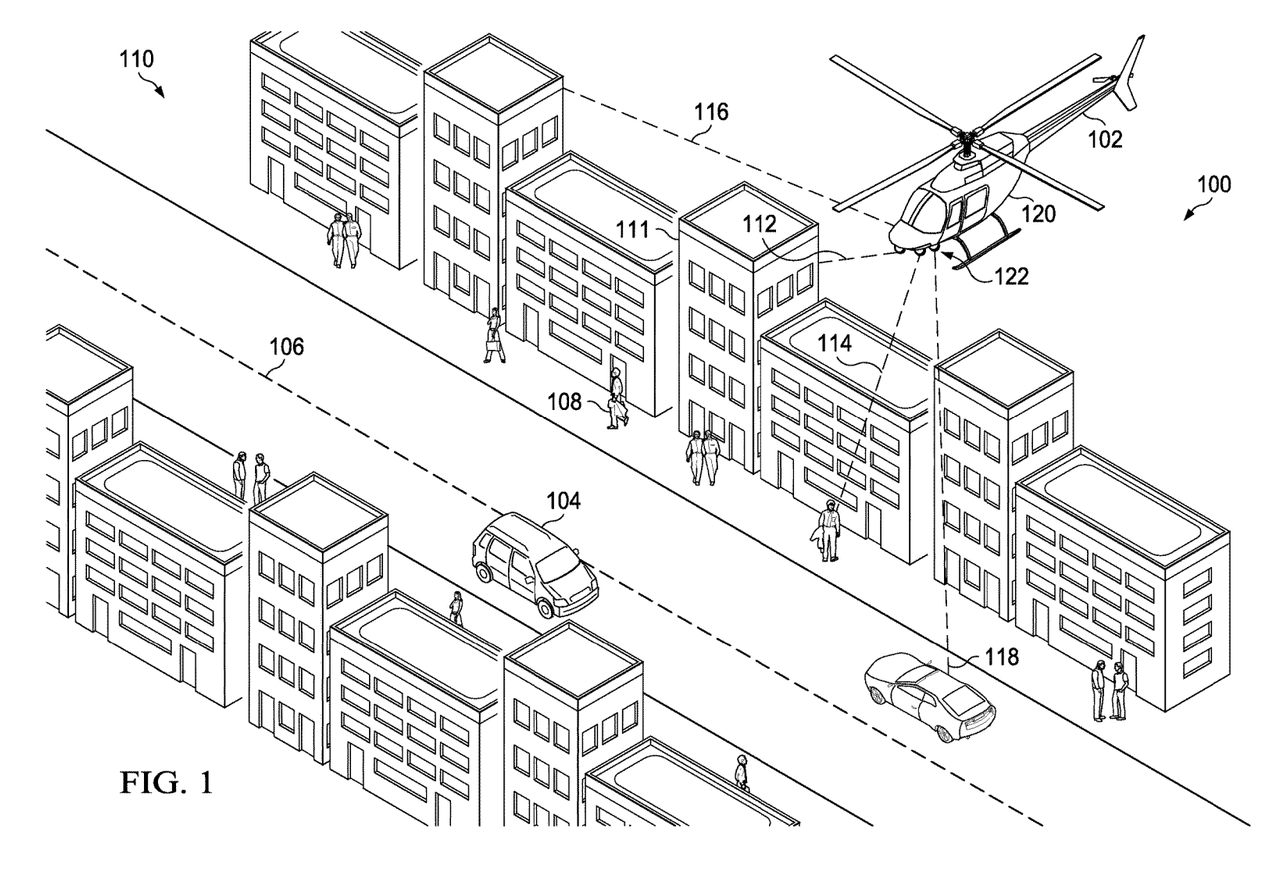
FIG. 1 is a pictorial illustration of an image environment in accordance with an illustrative embodiment.

With reference now to the figures and, in particular, with reference to FIG. 1, a pictorial illustration of an image environment is depicted in accordance with an illustrative embodiment. Image environment 100 includes helicopter 102. In this illustrative example, helicopter 102 performs operations within image environment 100 while flying within image environment 100.

In one example, helicopter 102 may perform surveillance of vehicle 104 moving on road 106. As another example, helicopter 102 may perform surveillance of person 108 in city 110. As yet another example, helicopter 102 may perform surveillance of building 111 in city 110. These and other types of operations may be performed by helicopter 102 in image environment 100.

As depicted, laser beam 112, laser beam 114, laser beam 116, and laser beam 118 are directed at helicopter 102. Although four laser beams are shown in this example, other numbers of laser beams may target helicopter 102. For example, three laser beams, fifteen laser beams, forty laser beams, or some other number of laser beams may be directed at helicopter 102.

As depicted, the pilot of helicopter 102 may avoid distractions, dazzling, or other undesired effects caused by these laser beams by using aircraft display system 120. For example, images are received from cameras 122 in aircraft display system 120 on helicopter 102.

As the laser beams illuminate helicopter 102, some of cameras 122 also may be illuminated, directly or indirectly. The illumination of a particular camera in cameras 122 may only last for a millisecond, a second or several seconds.

As a result, the images generated by cameras 122 may have various levels of information over time. For example, when a camera in cameras 122 is illuminated by a laser beam, the image sensor has a saturation level that may generate images in which objects cannot be identified as desired. Spots of bright light may be present in the images when the camera is illuminated by a laser beam. The spots of bright light obscure objects that are normally shown in the image without illumination by the laser beam. As a result, the image does not have a desired level of information for use by the pilot. When the laser beam no longer hits the camera, the camera may then generate images with a desired level of information.

In this illustrative example, aircraft display system 120 may manage the images in a manner that reduces the effects from laser beams being pointed at helicopter 102. For example, the illustrative embodiments provide a method and apparatus for overcoming the effects of light sources being directed at cameras in a camera system. In one illustrative example, an apparatus comprises cameras and an image manager. This apparatus may be a part or all of aircraft display system 120 in helicopter 102 in FIG. 1.

The cameras are in a camera system associated with a platform, such as helicopter 102. The cameras have different fields of view. A field of view of one camera may overlap with the fields of view of other cameras. The image manager is in communication with the camera system.

The image manager identifies images from a group of the cameras that have a desired level of information when a group of light sources is directed at the camera system, and generates a fused image from a combination of the images from the group of cameras. The fused image enables performing an operation using the platform.

As used herein, "a group of," when used with reference to items, means one or more items. For example, "a group of cameras" is one or more cameras.

Figure 2:
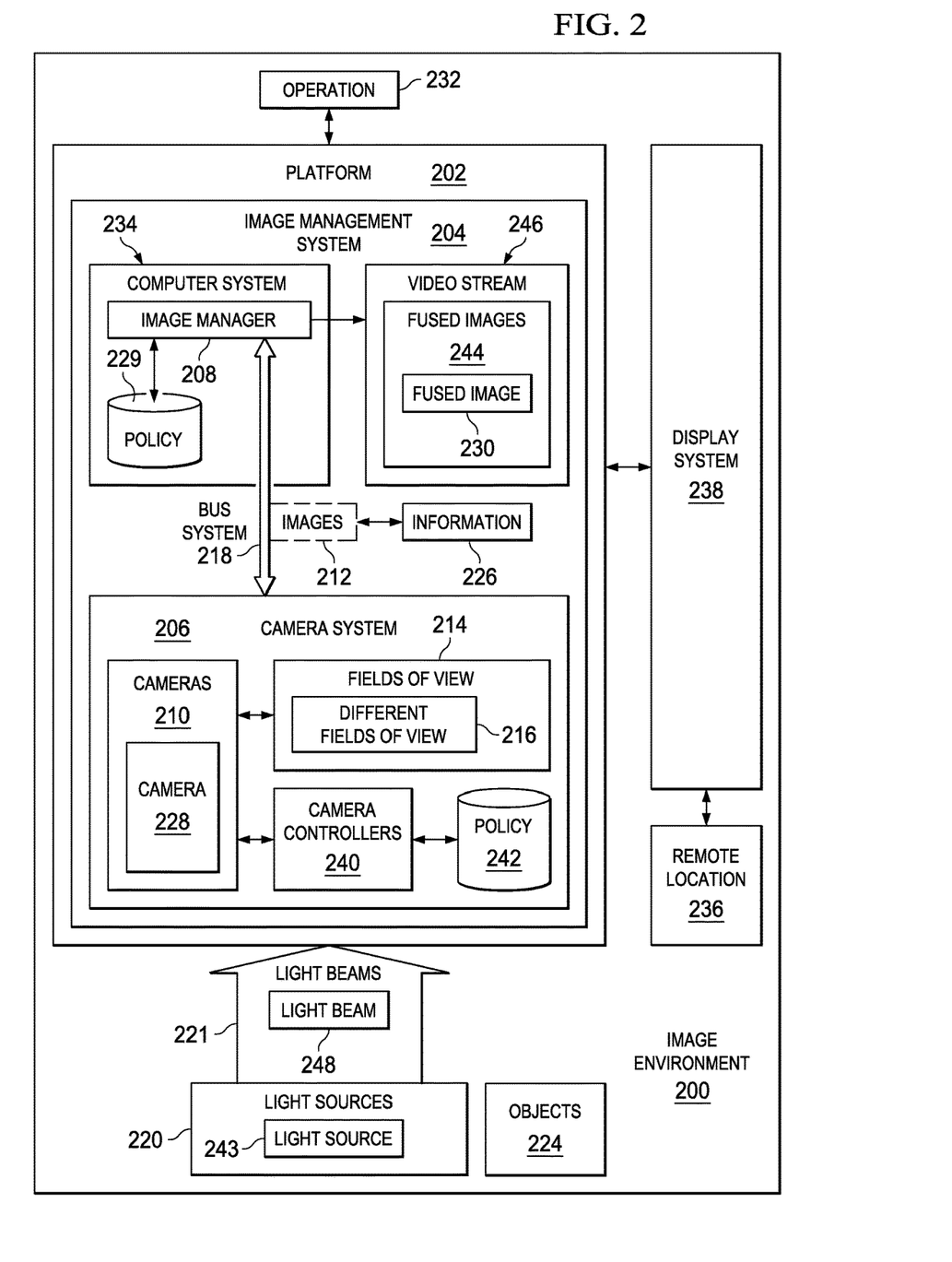
FIG. 2 is an illustration of a block diagram of an image environment in accordance with an illustrative embodiment.

With reference now to FIG. 2, an illustration of a block diagram of an image environment is depicted in accordance with an illustrative embodiment. Image environment 100 in FIG. 1 is an example of one implementation for image environment 200 shown in block form in this figure.

Image environment 200 includes platform 202. In this illustrative example, platform 202 is selected from one of a mobile platform, a stationary platform, a land-based structure, an aquatic-based structure, a space-based structure, an aircraft, an unmanned aerial vehicle, a rotorcraft, a helicopter, a surface ship, a tank, a personnel carrier, a train, a spacecraft, a space station, a satellite, a submarine, an automobile, a power plant, a bridge, a dam, a house, a manufacturing facility, and a building.

As depicted, image management system 204 is associated with platform 202. When one component is "associated" with another component, the association is a physical association in the depicted examples. For example, a first component, image management system 204, may be considered to be physically associated with a second component, platform 202, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, image management system 204 includes a number of different components. As depicted, image management system 204 includes camera system 206 and image manager 208. As used herein, a "number of" when used with reference to items means one or more items. For example, a number of components is one or more components.

Camera system 206 is comprised of cameras 210. Cameras 210 are positioned on platform 202. The positioning of cameras 210 is such that cameras 210 generate images 212 of image environment 200 around platform 202.

As depicted, cameras 210 have fields of view 214. A field of view is the extent of the environment that is observable by a camera in this illustrative example. In other words, the field of view is the extent of the environment that may be captured in an image by a camera.

Fields of view 214 may be different fields of view 216. Also, a portion of fields of view 214 may overlap each other.

As shown in this figure, image manager 208 and camera system 206 are in communication with each other. In this illustrative example, bus system 218 is connected to camera system 206 and image manager 208. Cameras 210 in camera system 206 and image manager 208 communicate with each other using bus system 218.

For example, cameras 210 may send images to image manager 208. As another example, image manager 208 may send commands or instructions to cameras 210.

Bus system 218 is a communications medium. Bus system 218 includes at least one of wires or fiber-optic lines.

During operation of platform 202, a group of light sources 220 may be directed at platform 202. For example, a group of light beams 221 from the group of light sources 220 may be directed at camera system 206 when the group of light sources 220 is directed at platform 202. For example, a group of light beams 221 from the group of light sources 220 may illuminate platform 202. The group of light beams 221 may directly or indirectly hit cameras 210 in camera system 206. For example, a portion of the group of light beams 221 may be reflected onto one or more of cameras 210.

In this illustrative example, the group of light sources 220 may be from the same or different types of light sources. For example, the group of light sources may be selected from at least one of a light source in the group of light sources, a laser, a light-emitting diode, an infrared light source, a high intensity discharge lamp, a search light, a spot light, a mirror reflecting sunlight, or some other type of light source.

The group of light sources 220 may cause one or more of cameras 210 to generate images 212 that do not have a desired level of information 226. In this illustrative example, a desired level of information 226 is a level of information 226 that makes images 212 useful for their intended purpose. For example, images 212 may be used for navigation, surveillance, information gathering, targeting, or other purposes.

In the illustrative example, objects 224 in image environment 200 may be seen in images 212 generated by camera 228 in cameras 210 when the group of light sources 220 is not directed at camera 228. When one or more of light sources 220 are directed at camera 228, images 212 generated by camera 228 may not show all of objects 224.

Image management system 204 reduces the effects from light sources 220 that may result in images 212 not having a desired level of information 226. For example, image manager 208 is in communication with camera system 206. Image manager 208 identifies images 212 from a group of cameras 210 that have a desired level of information 226.

Image manager 208 performs this identification when a group of light sources 220 is directed at camera system 206. The group of light sources 220 may not be purposefully directed at camera system 206. Instead, the group of light sources may be directed at platform 202 generally such that light sources 220 end up being directed at one or more of cameras 210 in camera system 206.

As depicted, the identification of images 212 may be performed using policy 229. Policy 229 is one or more rules and may include data that is used to determine which ones of images 212 have a desired level of information 226. For example, one or more rules may identify images 212 having a desired level of information 226 based on at least one of saturation level, brightness, focus level, field of view, contrast, change in objects in a scene, ability to see objects 224 in images 212, or other suitable factors.

In identifying images 212 from the group of cameras 210 that have a desired level of information 226, image manager 208 may identify portions of images 212 from the group of cameras 210 that have the desired level of information 226. In other words, a first portion of an image may not have a desired level of information 226 while another portion of the image may have a desired level of information. The portion of the image with a desired level of information may be used to generate fused image 230.

In the illustrative example, a portion may be part of an image or all of an image. The portion depends on how much of the image is usable.

As depicted, image manager 208 generates fused image 230 from a combination of images 212 from the group of cameras 210. The combining of images 212 may be performed using various techniques such as image stitching, photo stitching, or other techniques for combining multiple images into a single image.

Fused image 230 enables performing operation 232 using platform 202. In particular, operation 232 may be performed using platform 202 with reduced interference from light sources 220.

In the illustrative example, operation 232 may take various forms. For example, operation 232 may be selected from one of navigation, surveillance, information gathering, deploying objects, and other suitable operations.

In the illustrative example, image manager 208 may be implemented in software, hardware, firmware, or a combination thereof. When software is used, the operations performed by image manager 208 may be implemented in program code configured to run on hardware, such as a processor unit. When firmware is used, the operations performed by image manager 208 may be implemented in program code and data and stored in persistent memory to run on a processor unit. When hardware is employed, the hardware may include circuits that operate to perform the operations in image manager 208.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, image manager 208 may be implemented in computer system 234. Computer system 234 is a hardware system and includes one or more data processing systems. When more than one data processing system is present, those data processing systems may be in communication with each other using a communications medium. The communications medium may be a network. The data processing systems may be selected from at least one of a computer, a server computer, a tablet computer, or some other suitable data processing system.

Computer system 234 may be located in at least one of platform 202 or in remote location 236. In other words, image manager 208 may be located in at least one of platform 202 or remote location 236 to platform 202.

In the illustrative example, display system 238 may be used to display fused image 230. As depicted, display system 238 is a hardware system and includes one or more display devices on which fused image 230 may be displayed. The display devices may include at least one of a light-emitting diode display (LED), a liquid crystal display (LCD), an organic light-emitting diode display (OLED), or some other suitable device on which fused image 230 can be displayed.

Display system 238 may be located in at least one of platform 202 or remote location 236. In one illustrative example, platform 202 may be an aircraft such as a manned aircraft or an unmanned aerial vehicle. When platform 202 is a manned aircraft, display system 238 may be located in the aircraft. When platform 202 is an unmanned aerial vehicle, display system 238 may be in remote location 236 to the unmanned aerial vehicle. This location may be a platform selected from one of a surface ship, a building, a ground vehicle, another aircraft, a space station, or other suitable type of platform.

In still another illustrative example, display system 238 may include more than one display device that is located in both the aircraft and the platform in remote location 236. In this manner the visualization may be viewed by human operators in the aircraft as well as by human viewers in the platform in remote location 236.

When display system 238 is used with image manager 208 and camera system 206, these components may form an aircraft display system. For example, these components may be used in aircraft display system 120 in FIG. 1.

In the illustrative example, image management system 204 also may include camera controllers 240 associated with cameras 210. As depicted, camera controllers 240 may be the controllers currently used in a camera with additional features for managing images 212 sent to image manager 208. For example, camera controllers 240 may be microprocessors, digital signal processors (DSPs), or some other type of processor unit located in cameras 210.

As depicted, the camera controllers may decide when images 212 are sent to image manager 208 based on policy 242. Policy 242 is one or more rules and may include information used to apply the rules to images 212.

For example, policy 242 may set a saturation level that is acceptable for sending images 212. When light source 243 is on camera 228, the light from light source 243 may result in a saturation level on the image sensor that is greater than the level set by policy 242. When that saturation level occurs, camera 228 does not send images 212 to image manager 208.

In this manner, the number of images 212 that may need to be examined by image manager 208 may be reduced. As a result, camera controllers 240 may perform a first cut or selection of images 212 that are to be sent to image manager 208.

Images 212 may still include one or more images that do not have a desired level of information 226. These images may still have portions with a desired level of information in this illustrative example.

Further, fused image 230 may be a part of fused images 244 that is sent to display system 238, and fused images 244 may form video stream 246. As depicted, at least one of fused image 230, fused images 244, or video stream 246 may be generated by image manager 208 in real time. For example, video stream 246 may be generated while platform 202 operates to provide a visualization of image environment 200. For example, video stream 246 may show one or more of objects 224.

As different ones of cameras 210 are illuminated by the group of light beams 221 from the group of light sources 220, the cameras in the group of cameras 210 that generate images 212 with a desired level of information 226 may change. In other words, light beam 248 in the group of light beams 221 may move based on movement caused by a light source in the group of light sources 220, movement of platform 202, or some combination thereof.

In one illustrative example, one or more technical solutions are present that overcome a technical problem with performing operations using a platform, such as an aircraft, when light sources, such as lasers, are directed towards the aircraft. One or more of the technical solutions may provide a technical effect that provides a fused image with a desired level of information enabling performing the operations. In the illustrative example, image manager 208 generates a fused image using images from the cameras in which the images selected for creating fused image are based on images or portions of the images that have a desired level of information 226.

Thus, as the useable images from the cameras in the group of cameras 210 change over time, image manager 208 generates fused images 244 from images 212 from the group of cameras 210 that generates images 212 with the desired level of information 226 as each fused image in fused images 244 is created. As a result, image manager 208 may dynamically generate fused images 244 from whichever ones of cameras 210 provide images 212 with a desired level of information 226.

As a result, computer system 234 operates as a special-purpose computer system in which image manager 208 in computer system 234 enables creating fused image 230 with a greater level of information than any one of images 212 when light sources 220 are directed towards platform 202. In particular, image manager 208 transforms computer system 234 into a special-purpose computer system as compared to currently available general computer systems that do not have image manager 208.

Computer system 234 also performs a transformation of data. For example, image manager 208 in computer system 234 identifies images 212 from a group of cameras 210 that have a desired level of information 226. These images are combined to form fused image 230. The combination of images 212 may enable viewing objects 224 in fused image 230 that are not viewable in images 212 because of light sources 220 that are directed towards platform 202.

Figure 3:
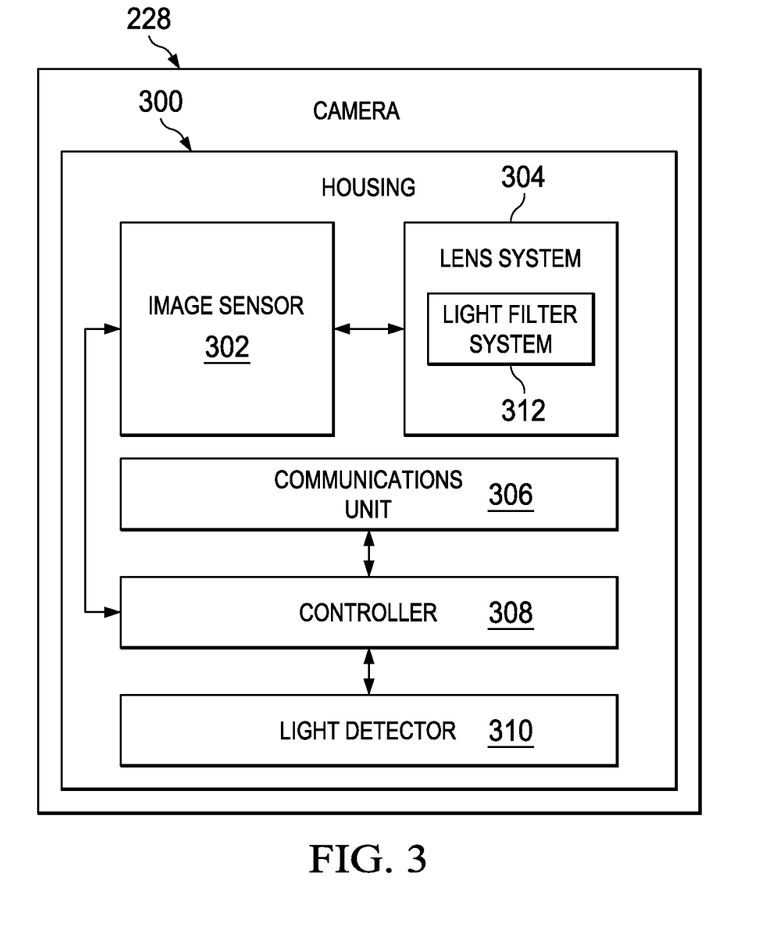
FIG. 3 is an illustration of a block diagram of a camera in accordance with an illustrative embodiment.

With reference next to FIG. 3, an illustration of a block diagram of a camera is depicted in accordance with an illustrative embodiment. An example of components that may be used in camera 228 are shown in this figure. As depicted, camera 228 includes housing 300, image sensor 302, lens system 304, communications unit 306, controller 308, and light detector 310.

Housing 300 is a physical structure with which the other components in camera 228 may be associated. Housing 300 may be formed of any material and have any shape that is suitable for use on platform 202 in FIG. 2. For example, housing 300 may be formed from at least one of a metal, aluminum, a composite material, plastic, polycarbonate, or some other suitable material.

The shape of housing 300 may be one that is aerodynamic or allows for a desired airflow over platform 202. In some illustrative examples, the shape of housing 300 may not take into account airflow if camera 228 is located inside of platform 202 behind a window or other transparent structure.

In this illustrative example, image sensor 302 is a physical device that generates signals for an image. Image sensor 302 may be comprised of photo sensors that each generate a signal for a pixel in the image. Image sensor 302 may be implemented using devices such as a complementary metal oxide semiconductor (CMOS) sensor, a charge-coupled device (CCD) image sensor, or some other suitable type of device.

Lens system 304 may include one or more lenses. Lens system 304 may direct, focus, filter, or perform other operations on light that is received at camera 228. For example, lens system 304 may include light filter system 312.

Light filter system 312 is positioned such that light passes through light filter system 312 to image sensor 302. For example, light filter system 312 may include filters for colors of light selected from at least one of red, green, or blue, that may be used by light sources 220 in FIG. 2, such as those used in lasers. In this manner, light filter system 312 may reduce or remove the effects caused by some of light sources 220.

As depicted, communications unit 306 communicates with image manager 208 in this illustrative example. The communications are performed over bus system 218. Communications unit 306 may include at least one of a network adapter, a serial bus connector, a universal serial bus connector, or some other suitable type of communications mechanism.

In this illustrative example, controller 308 controls the operation of different components such as image sensor 302 and communications unit 306. For example, controller 308 may decide whether to generate and send images 212 to image manager 208 from camera 228 using policy 242 in FIG. 2. Additionally, controller 308 also performs noise reduction in other operations on images 212 generated by camera 228 prior to sending images 212 to image manager 208.

Light detector 310 is a sensor that is configured to detect when camera 228 is illuminated or hit by light source 243. For example, light detector 310 may be designed to detect when camera 228 has been illuminated by a laser.

As depicted, camera 228 may be implemented using different types of cameras. For example, camera 228 may be implemented using a pin-hole camera, a video camera, a still image camera, a thermal imaging camera, a stereoscopic camera, or some other suitable type of camera.

The illustration of image environment 200 and the different components in image environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, image manager 208 is shown as a single component. Image manager 208 may be distributed on different data processing systems in computer system 234. These different data processing systems may be on platform 202, remote location 236, other locations, or some combination thereof. As another example, wireless communication links may be used for communications between cameras 210 and image manager 208 in addition to or in place of bus system 218.

As another example, image manager 208 may perform other operations with respect to images 212. For example, image manager 208 may reduce noise in images 212 prior to identifying images 212 from the group of cameras 210 that has the desired level of information 226. The noise reduction may be performed using any available noise reduction technique. For example, the noise reduction may be performed using at least one of anisotropic diffusion, Gaussian blur, dark-frame subtraction, a median filter, local pixel grouping, or other suitable noise reduction techniques for images 212.

Figure 4:
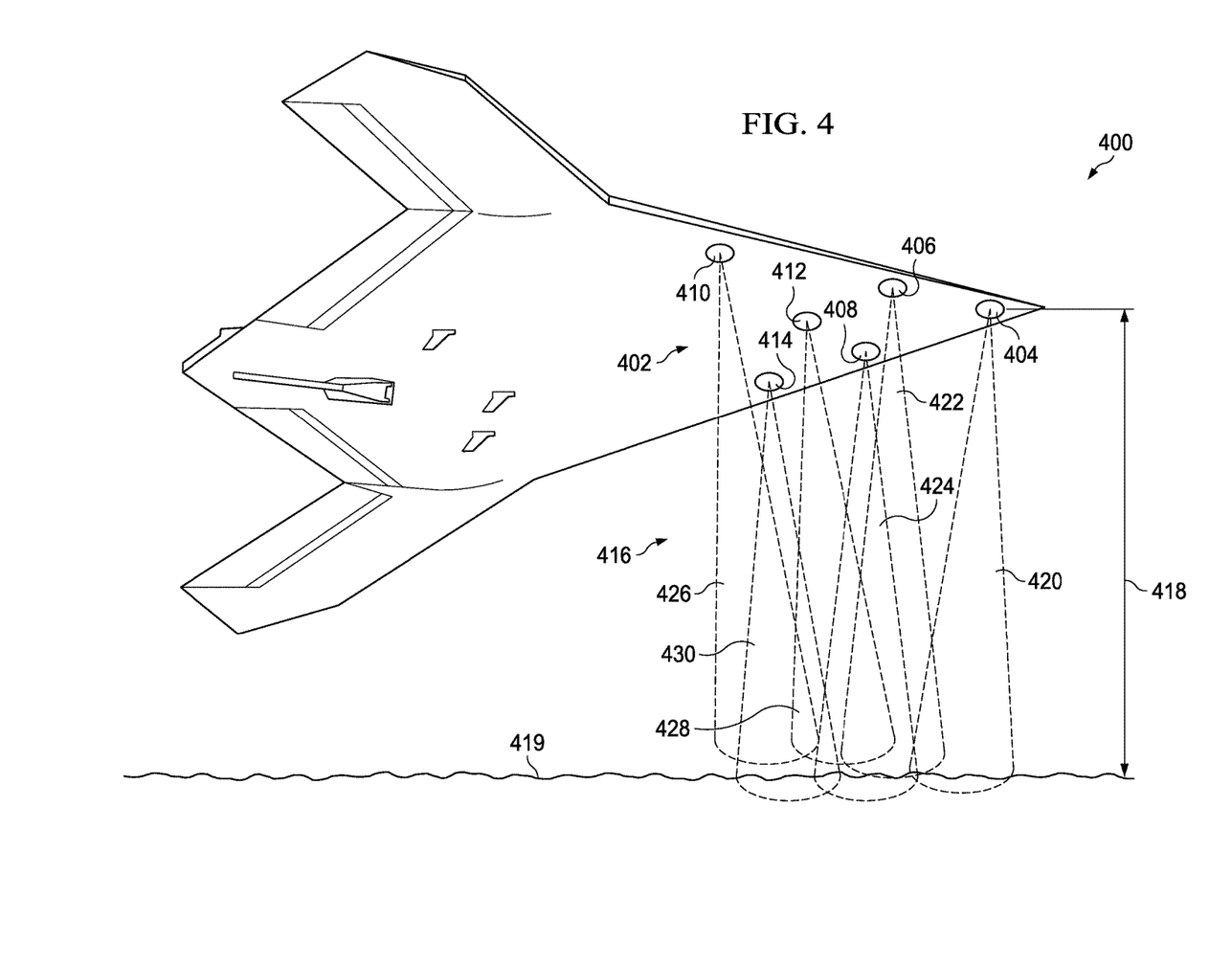
FIG. 4 is an illustration of an unmanned aerial vehicle in accordance with an illustrative embodiment.

Turning next to FIG. 4, an illustration of an unmanned aerial vehicle is depicted in accordance with an illustrative embodiment. Unmanned aerial vehicle (UAV) 400 is an example of one implementation for platform 202 shown in block form in FIG. 2.

As depicted, cameras 402 are located on unmanned aerial vehicle 400. In this particular example, cameras 402 include camera 404, camera 406, camera 408, camera 410, camera 412, and camera 414. Each of cameras 402 may be implemented using a camera such as camera 228 shown in block form in FIGS. 2 and 3.

In this example, cameras 402 include six cameras. In other examples, other numbers of cameras may be used to implement cameras 402. For example, three cameras, fifteen cameras, twenty-four cameras, or some other number of cameras may be used. Further, cameras may in other locations other than those shown on unmanned aerial vehicle 400 in this particular example.

In this illustrative example, cameras 402 are arranged as an array in which different cameras in cameras 402 may have different fields of view. In this illustrative example, fields of view 416 are shown for cameras 402 at distance 418. As depicted, distance 418 is from unmanned aerial vehicle 400 to ground 419.

As depicted, camera 404 has field of view 420, camera 406 has field of view 422; camera 408 has field of view 424; camera 410 has field of view 426; camera 412 has field of view 428; and camera 414 has field of view 430.

As depicted, camera 404, camera 406, camera 408, camera 410, and camera 414 have the same field of view. Camera 412 has a larger field of view as compared to these cameras. In other illustrative examples, the cameras may all have different fields of view or all have the same field of view.

Cameras 402 generate images. In this illustrative example, camera 412 is a primary camera from which images are normally generated for use by the pilot. If a laser or other light source illuminates camera 412 in a manner such that camera 412 is unable to generate images with a desired level of information, images from other cameras in cameras 402 may be used to generate an image having the field of view for camera 412.

The images used from cameras 402 are selected as ones that have a desired level of information. In this illustrative example, camera 412 provides images with a desired field of view during normal operation of unmanned aerial vehicle 400. If one or more laser beams illuminates camera 412, camera 412 may no longer generate images with a desired level of information. In other words, spots or other undesired effects in images may be present that prevent seeing objects normally seen with a desired level of detail.

In the illustrative examples, images from other cameras, such as at least one of camera 404, camera 406, camera 408, camera 410, and camera 414 may be combined if these cameras provide images with a desired level of information. In the depicted example, cameras may be selected as ones that have an overlapping field of view with camera 412. The portions of the images from those cameras that correspond to the field of view for camera 412 may be selected to generate a fused image.

This process is performed dynamically and the cameras used as a source of images may change as the laser beams or other types of lights illuminate other cameras on unmanned aerial vehicle 400. As a result, the selection of images may be performed dynamically to provide fused images in a video with a desired level of information for use in performing operations by unmanned aerial vehicle 400.

Additionally, cameras 402 may be adjustable such that at least one of the directions or fields of view change for cameras 402. Further, the illustration of cameras 402 are only provided to illustrate features that may be present in different illustrative examples and are not meant to limit the manner in which other illustrative examples may be implemented. For example, this example shows cameras 402 as being located on the bottom of unmanned aerial vehicle 400. In other illustrative examples, other cameras may be located on the side, nose, top, or other locations on unmanned aerial vehicle 400 in addition to or in place of the bottom of unmanned aerial vehicle 400.

Figure 5:
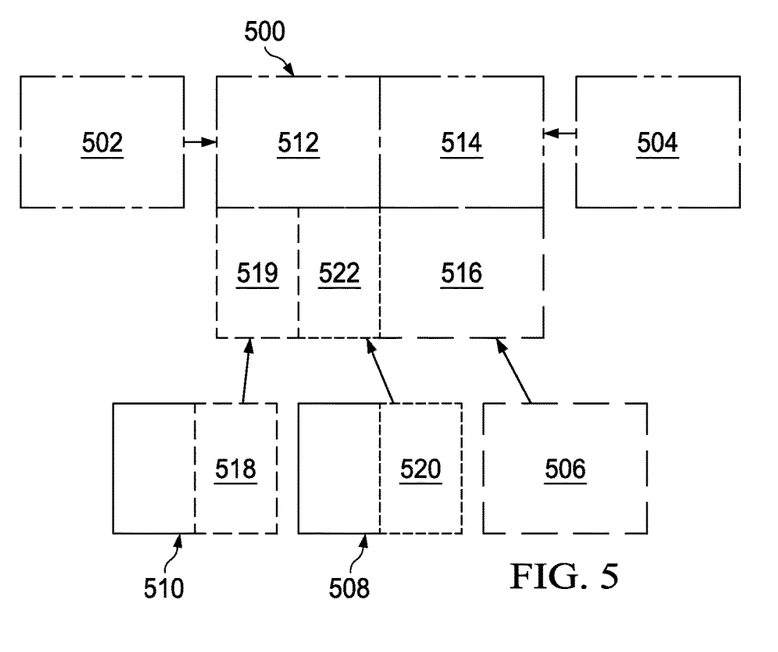
FIG. 5 is an illustration of a fused image formed from combining images in accordance with an illustrative embodiment.

With reference next to FIG. 5, an illustration of a fused image formed from combining images is depicted in accordance with an illustrative embodiment. In this illustrative example, fused image 500 is formed from combining image 502, image 504, image 506, image 508, and image 510. These images are generated by cameras 402 in FIG. 4. As depicted, these images are all generated at the same time or substantially the same time by the cameras.

For example, fused image 500 may be an image that would be generated by camera 412 if camera 412 generates images with a desired level of information. If a laser beam illuminates camera 412, the images from the other cameras may be used to form fused image 500. For example, camera 404 generates image 508; camera 406 generates image 506, camera 408 generates image 510; camera 410 generates image 504; and camera 414 generates image 502.

Cameras 402 generating these images have a field-of-view in which at least a portion of the field-of-view corresponds to a portion of the field of view desired for fused image 500. The field of view in fused image 500 may be the actual field of view of camera 412. However, in other illustrative examples, fused image 500 may have a virtual field of view. In other words, fused image 500 may have a field of view that does not correspond to an actual field of view for a camera on unmanned aerial vehicle 400.

In this illustrative example, image 502 forms portion 512 of fused image 500, image 504 forms portion 514 of fused image 500, and image 506 forms portion 516 of fused image 500. Portion 518 of image 510 forms portion 519 of fused image 500, and portion 520 of image 508 forms portion 522 of fused image 500. As can be seen, a portion of or all of an image may be used to form fused image 500 when combining images from cameras 402.

In some cases, a gap in information may present in which no images are currently present that may be used in a portion of fused image 500. For example, no images with a desired level of information may be present for the field of view that is in in portion 519 of fused image 500. In that case, portion 519 may be blank or may be filled using a prior image having that corresponding field of view in portion 519 of fused image 500 that had the desired level of information for portion 519.

The illustration of unmanned aerial vehicle 400 with cameras 402 in FIG. 4 and the images generated by these cameras as shown by image 502, image 504, image 506, image 508, image 510, and fused image 500 in FIG. 5 are provided for purposes of illustrating one manner in which an illustrative embodiment may be implemented. This illustration is not meant to limit the manner in which other illustrative embodiments may be implemented. For example, other numbers of cameras may be used. In other illustrative examples, the camera for which fused image 500 is shown may have a field of view that is the same size as the other cameras.

As another example, portion 518 and portion 520 are shown as being rectangular portions. In other illustrative examples, a portion identified for use in forming a fused image may have other shapes. For example, the portion may be square, rectangular, irregular, or any other suitable shape of a desired level of information. Further, the different images used to form fused image 500 may overlap each other with a stitching process taking into account overlaps that have the same information.

In still other illustrative examples, the field of view of fused image 500 may change. For example, the field of view may change to track the direction in which the pilot in an aircraft is looking while operating the aircraft.

Figure 6:
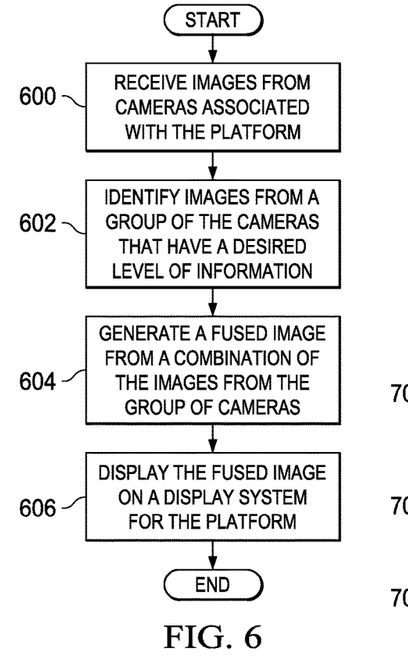
FIG. 6 is an illustration of a flowchart of a process for countering an attack on a platform in accordance with an illustrative embodiment.

Turning next to FIG. 6, an illustration of a flowchart of a process for countering an attack on a platform is depicted in accordance with an illustrative embodiment. The process illustrated in FIG. 6 may be implemented in image environment 200 in FIG. 2. For example, the process may be implemented in image manager 208 in FIG. 2.

The process begins by receiving images from cameras associated with the platform (operation 600). The process then identifies images from a group of the cameras that have a desired level of information (operation 602). In operation 602, the images are ones that are generated at substantially the same time. Further, operation 602 may occur when a group of light sources is directed at the camera system.

The process generates a fused image from a combination of the images from the group of cameras (operation 604). The process displays the fused image on a display system for the platform (operation 606) with the process terminating thereafter. The fused image enables performing an operation using the platform.

This process may be repeated any number of times. For example, the process may be repeated continuously during operation of the platform to generate fused images for a video stream. Over time, the process may select images from a different group of cameras as the group of light sources directs light that hits different cameras associated with the platform.

Figure 7:
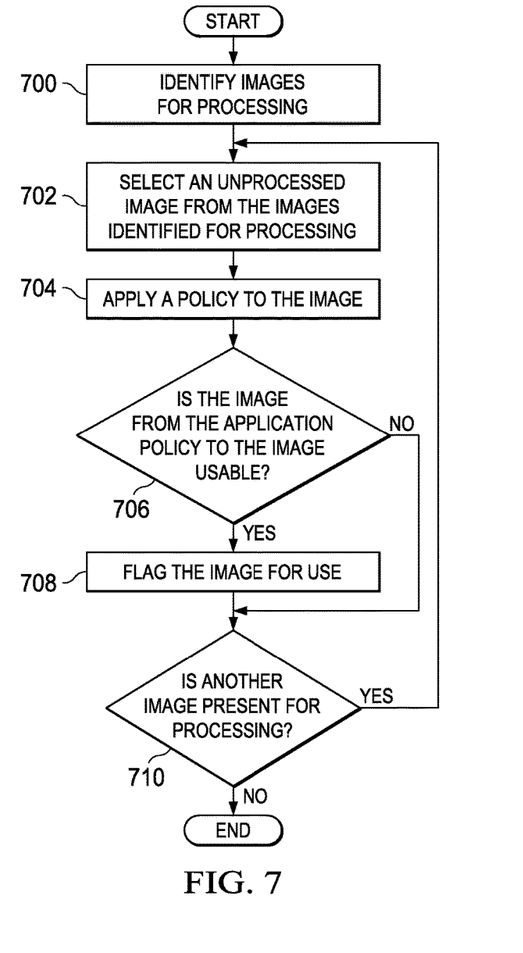
FIG. 7 is an illustration of a flowchart of a process for identifying images that have a desired level of information in accordance with an illustrative embodiment.

Turning to FIG. 7, an illustration of a flowchart of a process for identifying images that have a desired level of information is depicted in accordance with an illustrative embodiment. The process illustrated in FIG. 7 is an example of an implementation for operation 600 in FIG. 6.

The process begins by identifying images for processing (operation 700). In operation 700, the images are selected as ones that are taken or captured by the cameras at substantially the same time. For example, the images are generated by exposure of the image sensors at substantially the same time. In one illustrative example, the time of the images may be identified using timestamps or some other suitable mechanism.

The process selects an unprocessed image from the images identified for processing (operation 702). The process applies a policy to the image (operation 704). The policy includes one or more rules and data that may be applied to the image. The policy is used to determine whether the image has a desired level of information. In other words, the policy is used to determine whether the image can be used for its intended purpose.

For example, the policy may have a rule used to determine whether the image can be used for navigation. In another example, the policy may state that a particular object of interest should be identifiable in the image. Further, the policy may indicate that the image is usable even if only a portion of the image has the desired level of information. In this case, the portion of the image may be used to form the fused image.

In yet another example, the policy may identify a desired field of view for the fused image. The policy may include a rule to determine whether the image has a field of view that overlaps the desired field. The overlap would indicate the portion of the image that may be usable if that portion of the image has a desired level of information.

A determination is made as to whether the image is usable from the application of the policy to the image (operation 706). If the image is usable, the image is flagged for use (operation 708). In this illustrative example, the flag may be an indicator that the image is usable. In another illustrative example, the flag may include information indicating what portions of the image are usable. For example, the flag may include coordinates describing the perimeter of the portion of the image that may be used.

The process then determines whether another image is present for processing (operation 710). If another image is present, the process returns to operation 702 to select another image for processing. Otherwise, the process terminates.

With reference again operation 706, if the image is not usable, the process proceeds to operation 710. In this manner, the different images may be processed to identify which images from a group of cameras can be used to form the fused image.

Figure 8:
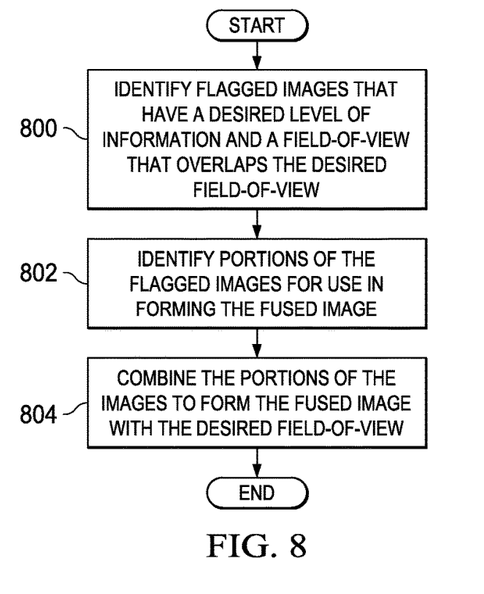
FIG. 8 is an illustration of a flowchart of a process for generating a fused image in accordance with an illustrative embodiment.

With reference next to FIG. 8, an illustration of a flowchart of a process for generating a fused image is depicted in accordance with an illustrative embodiment. The process illustrated in FIG. 8 is an example of one implementation for operation 604 in FIG. 6.

The process identifies flagged images that have a desired level of information and a field of view that overlaps the desired field of view (operation 800). The process then identifies portions of the flagged images for use in forming the fused image (operation 802). The portions identified may be based on flags for the images in the process in FIG. 7.

The process then combines the portions of the images to form the fused image with the desired field of view (operation 804) with the process terminating thereafter. Operation 804 may be formed using an image combining technique such as image stitching, photo stitching, or some other process that combines images.

The process in FIG. 8 may be performed any number of times. For example, the process may be repeated to form a plurality of fused images for a video stream.

Figure 9:
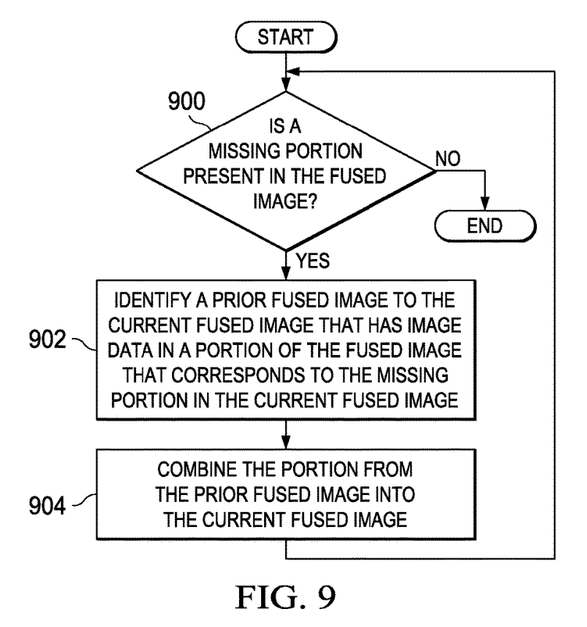
FIG. 9 is an illustration of a flowchart of a process for managing missing portions in a fused image in accordance with an illustrative embodiment.

Turning now to FIG. 9, an illustration of a flowchart of a process for managing missing portions in a fused image is depicted in accordance with an illustrative embodiment. The process illustrated in FIG. 9 may be implemented as part of operation of 604 in FIG. 6. These operations may be performed after the operations performed in FIG. 8 occur. In some cases, a portion of the fused image may not include image data from the images identified as having a desired level of information. This portion of the fused image is referred to as a missing portion.

The process determines whether a missing portion is present in the fused image (operation 900). If a missing portion is present, the process identifies a prior fused image to the current fused image that has image data in a portion of the fused image that corresponds to the missing portion in the current fused image (operation 902). The process then combines the portion from the prior fused image into the current fused image (operation 904) with the process then returning to operation 900 to determine whether the fused image still has another missing portion.

With reference again to operation 900, if a missing portion is not present in the fused image, the process terminates. This process may be used to provide a better visualization of the scene in the image to an operator such as a human pilot as compared to having missing portions in the fused images. In this manner, flickers or other distractions may be reduced.

In some cases, the missing portion may be left in the fused image to indicate that the information in that portion is not available. Further, if the portion is missing over some threshold number of images, an indication may be made that a portion of the fused image is missing.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
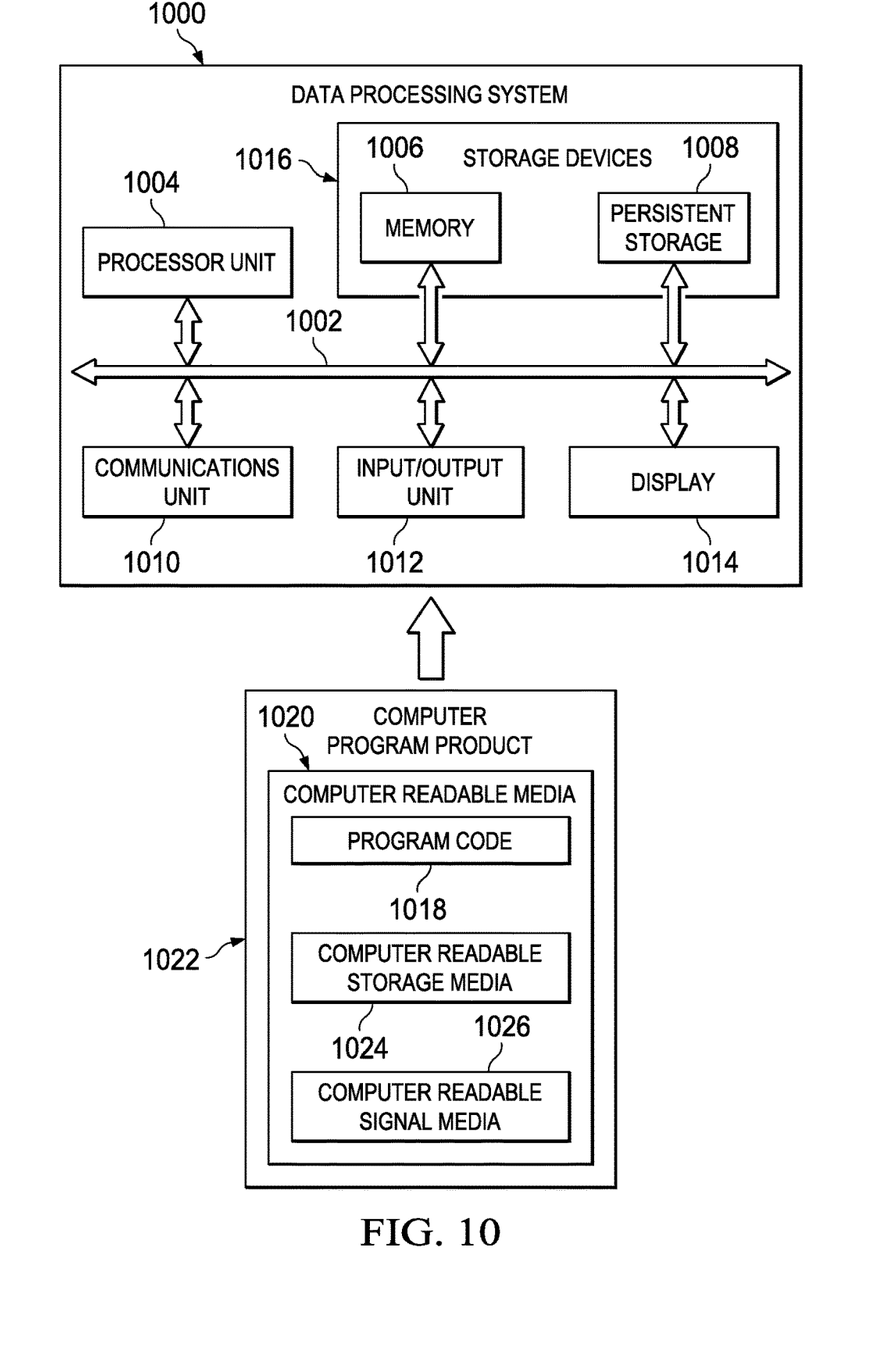
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement computer system 234 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026. In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Figure 11:
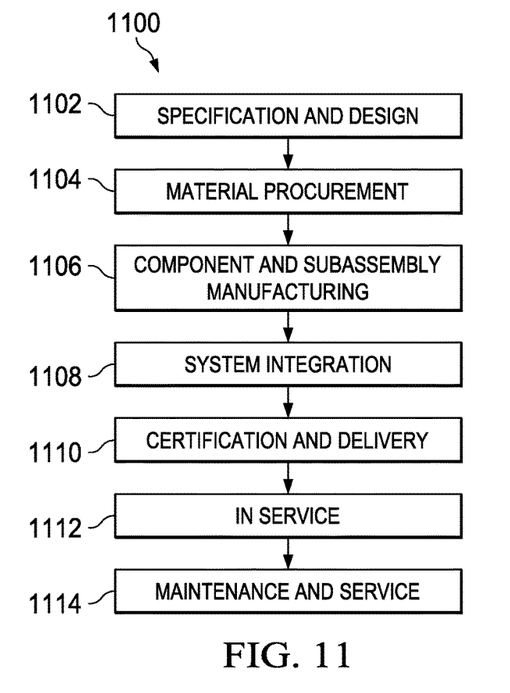
FIG. 11 is an illustration of a block diagram of an aircraft manufacturing and service method in accordance with an illustrative embodiment.
Figure 12:
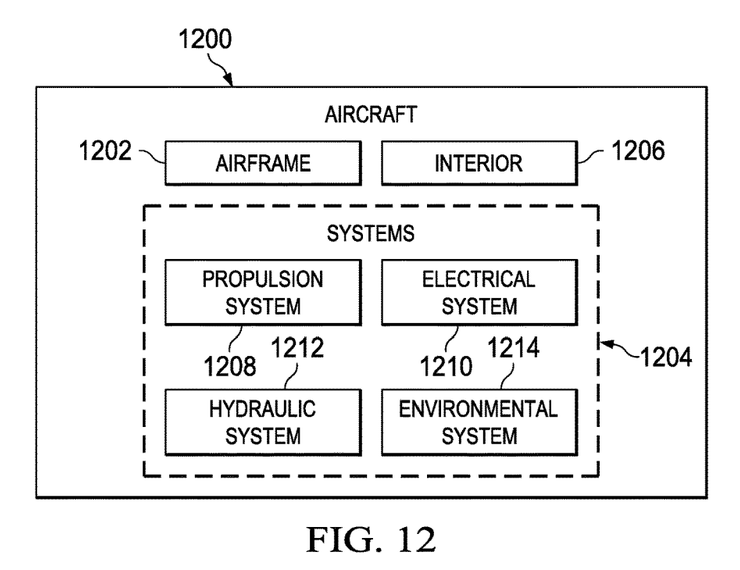
FIG. 12 is an illustration of a block diagram of an aircraft in accordance with an illustrative embodiment.

The illustrative embodiments of the disclosure may be described in the context of aircraft manufacturing and service method 1100 as shown in FIG. 11 and aircraft 1200 as shown in FIG. 12 when the platform takes the form of aircraft 1200. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as, for example, the automotive industry, spacecraft industry, and the ship building industry.

The apparatuses and methods embodied herein may be employed during at least one of the stages of aircraft manufacturing and service method 1100 in FIG. 11. In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. For example, one or more components of image management system 204 may be fabricated during component and subassembly manufacturing 1106. Components for image management system 204 may installed during system integration 1108 of aircraft 1200.

As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112. For example, image management system 204 may be used while aircraft 1200 is in service 1112 to provide desired level of information for performing operations using aircraft 1200.

Thus, one or more of the illustrative examples overcome a technical problem with performing operations using an aircraft when light sources are directed towards the aircraft. The image manager manages images in a manner that counters an attack on a platform using light. The illustrative examples use images generated by cameras on the platform in a manner that reduces the effect of directing light sources, such as lasers, at a platform such as an aircraft. The one or more technical solutions provided using the image manager have a technical effect of providing information about objects in images with a desired level of information. In an illustrative example, the image manager may select and combine images as the platform is operating in real-time and provide a desired visualization of the environment in which the platform operates.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a plurality of cameras in a camera system associated with a platform, wherein the plurality of cameras generate a plurality of images, and wherein each camera in the plurality of cameras generates an image in the plurality of images; and
    an image manager in communication with the camera system, wherein the image manager identifies one or more first cameras in the plurality of cameras that are illuminated by a laser beam directed at the one or more first cameras and creates a fused image comprising images in the plurality of images from second cameras in the plurality of cameras that are not identified as being illuminated by the laser beam and excluding images in the plurality of images from the one or more first cameras in the plurality of cameras that are identified as being illuminated by the laser beam directed at the one or more first cameras.

2. The apparatus of claim 1 further comprising:
    a bus system connected to the camera system and the image manager, wherein the cameras and the image manager communicate with each other using the bus system.

3. The apparatus of claim 1, wherein in identifying the one or more first cameras in the plurality of cameras that are illuminated by the laser beam directed at the one or more first cameras, the image manager identifies images from the plurality of images that include spots of bright light created by the laser beam.

4. The apparatus of claim 3, wherein the image manager reduces noise in the plurality of images prior to identifying the images from the plurality of images that include spots of bright light created by the laser beam.

5. The apparatus of claim 1 further comprising:
    a display system in communication with the image manager, wherein the image manager displays the fused image.

6. The apparatus of claim 1 further comprising:
    camera controllers associated with the cameras, wherein the camera controllers decide when the images are sent to the image manager based on a policy.

7. The apparatus of claim 6, wherein the policy sets a saturation level that is acceptable for sending the images.

8. The apparatus of claim 1, wherein each camera in the plurality of cameras comprises:
    an image sensor configured to generate the image;
    a light filter system positioned such that light passes though the light filter system to the image sensor;
    a light detector that identifies when the camera is being illuminated by the laser beam;
    a communications unit; and
    a controller, wherein the controller is in communication with the image sensor, the light detector, and the communications unit.

9. The apparatus of claim 1, wherein the image manager is in a location selected from one of the platform and a remote location to the platform.

10. The apparatus of claim 1, wherein fields of view of the plurality of cameras overlap each other.

11. The apparatus of claim 1, wherein the platform is selected from one of a mobile platform, a stationary platform, a land-based structure, an aquatic-based structure, a space-based structure, an aircraft, an unmanned aerial vehicle, a rotorcraft, a helicopter, a surface ship, a tank, a personnel carrier, a train, a spacecraft, a space station, a satellite, a submarine, an automobile, a power plant, a bridge, a dam, a house, a manufacturing facility, and a building.

12. The apparatus of claim 1, wherein the fused image enables performing an operation using the platform, wherein the operation is selected from one of navigation, surveillance, information gathering, and deploying objects.

13. An aircraft display system comprising:
a display system;
a plurality of cameras in a camera system associated with the aircraft, wherein the plurality of cameras have different fields of view, wherein the plurality of cameras generate a plurality of images, and wherein each camera in the plurality of cameras generates an image in the plurality of images; and
an image manager in communication with the display system and the camera system, wherein the image manager identifies one or more first cameras in the plurality of cameras that are illuminated by a laser beam directed at the one or more first cameras, creates a fused image comprising images in the plurality of images from one or more second cameras in the plurality of cameras that are not identified as being illuminated by the laser beam and excluding images in the plurality of images from the one or more first cameras in the plurality of cameras that are identified as being illuminated by the laser beam directed at the one or more first cameras, and displays the fused image on the display system s.

14. The aircraft display system of claim 13 further comprising:
camera controllers associated with the cameras, wherein the camera controllers decide when to send the images to the image manager based on a saturation level of image sensors in the cameras.

15. The aircraft display system of claim 13, wherein the aircraft is a manned aircraft and the display system is located in the aircraft.

16. The aircraft display system of claim 13, wherein the aircraft is an unmanned aerial vehicle and the display system is located on a second platform in a remote location to the aircraft, wherein the second platform is selected from one of a surface ship, a building, a ground vehicle, another aircraft, and a space station.

17. The aircraft display system of claim 13, wherein fields of view of the plurality of cameras overlap each other.

18. A method for countering an attack on a platform comprising:
receiving a plurality of images from a plurality of cameras associated with the platform, wherein each camera in the plurality of cameras generates an image in the plurality of images;
identifying one or more first cameras in the plurality of cameras that are being illuminated by a laser beam directed at the one or more first cameras; and
generating a fused image from a combination of images in the plurality of images from one or more second cameras in the plurality of cameras that are not identified as being illuminated by the laser beam and excluding images in the plurality of images from the one or more first cameras in the plurality of cameras that are identified as being illuminated by the laser beam directed at the one or more first cameras; and
displaying the fused image on a display system for the platform, wherein the fused image enables performing an operation using the platform.

19. The method of claim 18 further comprising:
reducing noise in the plurality of images prior to identifying the cameras in the plurality of cameras that are being illuminated by the laser beam.

20. The method of claim 18 further comprising:
sending the images from the cameras based on a policy.

21. The method of claim 18, wherein identifying the one or more first cameras in the plurality of cameras that are being illuminated by the laser beam comprises:
identifying images from the cameras that include spots of bright light.

22. The method of claim 18, wherein the platform is a manned aircraft and the display system is located in the manned aircraft.

23. The method of claim 18, wherein the platform is an unmanned aerial vehicle and the display system is located on a second platform in a location that is remote to the unmanned aerial vehicle, wherein the platform is selected from one of a surface ship, a building, a ground vehicle, another aircraft, and a space station.

* * * * *